United States Patent [19]

Robertson

[11] 4,241,770
[45] Dec. 30, 1980

[54] FUELING UNIT APPARATUS

[75] Inventor: Joseph D. Robertson, Butte, Mont.

[73] Assignee: The Anaconda Company, New York, N.Y.

[21] Appl. No.: 954,292

[22] Filed: Oct. 24, 1978

[51] Int. Cl.$^3$ ............................ B65B 3/18; B65B 3/26
[52] U.S. Cl. .................................. 141/198; 137/588; 141/285; 285/133 R
[58] Field of Search ................. 137/588, 592; 141/285, 141/286, 290, 295, 298, 299, 309, 310, 392, 198, 199, 204, 212–216, 220–222, 229, 303; 220/85 F, 86 R, 86 AT, 420, 465, 374; 285/133 R, 158

[56] References Cited

U.S. PATENT DOCUMENTS

| | | | |
|---|---|---|---|
| 1,978,002 | 10/1934 | Weaver | 141/295 X |
| 2,803,269 | 8/1957 | Switzer | 141/250 |
| 3,205,923 | 9/1965 | Wilson | 141/291 |
| 3,556,175 | 1/1971 | Wolf et al. | 141/285 |
| 3,590,869 | 7/1971 | Von Linsowe | 137/614.03 |
| 3,635,264 | 1/1972 | Milburn | 141/291 |
| 3,976,100 | 8/1976 | Souslin | 137/614.03 |
| 4,002,186 | 1/1977 | Fink et al. | 137/614.03 |

Primary Examiner—Frederick R. Schmidt
Attorney, Agent, or Firm—Pennie & Edmonds

[57] ABSTRACT

A fueling unit apparatus (10) for use between a fuel receiver (14), an inlet line (50), and a vent assembly (44) comprising:
(a) a double-walled tubular member (18, 20) insertable into the top of a fuel receiver (14);
(b) means (22) for retaining a portion of the double-walled tubular member externally as to the receiver (14);
(c) means (46) for connecting an inlet line (50) to that portion of the double-walled tubular member's outer wall member which is external to the receiver (14);
(d) a passage (28) defined by the inner wall members (20) of the double-walled tubular member which communicates between the vent assembly (44) and the receiver (14);
(e) a passage (26) defined by the inner (20) and outer wall (18) members of the double-walled tubular member which communicates between the inlet line (50) and the receiver (14);
(f) means (40) for connecting a vent assembly (44) to that portion of the double-walled tubular member's inner wall (20) member which is external to the receiver (14); and
(g) at least one port (36) which connects the vent assembly (44) and receiver's (14) interior with the passage (28) defined by the inner wall member (20) of the double-walled tubular member by extending through bores in both the inner (20) and outer wall (18) members.

9 Claims, 4 Drawing Figures

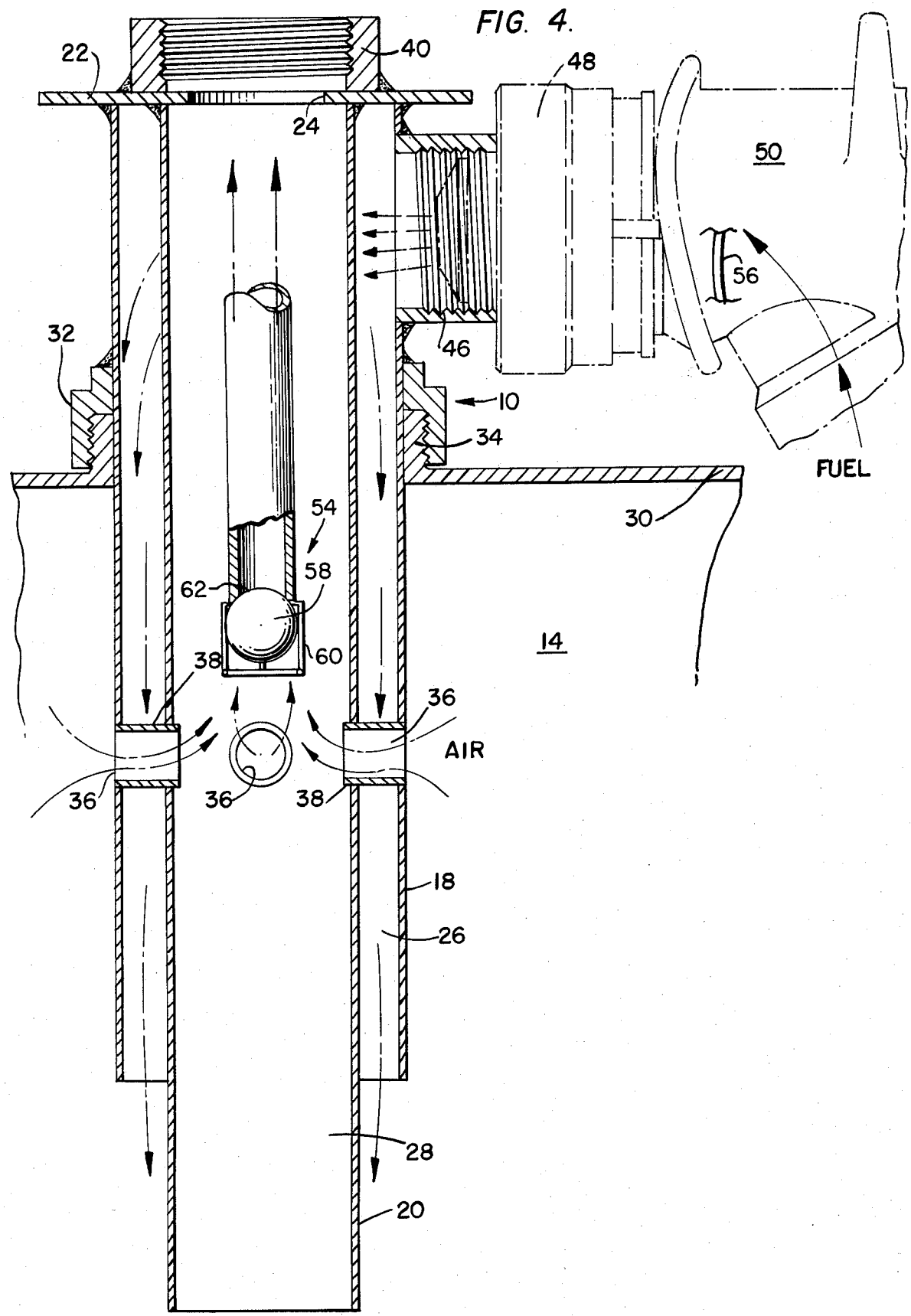

FUELING UNIT APPARATUS

TECHNICAL FIELD

The present invention relates to fueling unit apparatus for use between a fuel receiver, a nozzle of an inlet line, and a vent assembly.

BACKGROUND ART

Design requirements for automatic fueling systems must consider a system which permits clean, quick, automatic fueling of, for example, diesel or turbine powered equipment. Fueling rates of up to 150 gal/m. to improve equipment availability and usage are common.

The Aeroquip FD 65 Automatic Fueling System is an example of a quick, automatic, bottom fueling diesel or turbine powered equipment system. In operation, the Aeroquip inlet line nozzle is connected near ground level to the tank receiver with a firm, straight push. With the fuel pump operating, the nozzle fuel lever is actuated manually and clean fuel flows into the tank. The tank vents during fueling through a vent assembly which, when used with the hose, is baffled so as to prevent water or dirt from entering. A vent float valve closes when the tank is full, thereby pressurizing the tank. The pressure is transmitted through the fuel itself back to the tank receiver and into the nozzle where a diaphragm sensor is actuated at the desired pressure level. This closes the fuel valve automatically stopping the fuel flow. Specifics of the Aeroquip FD 65 Automatic Fueling System are disclosed in a bulletin titled "FD 65 Automatic Fueling System" copyright 1973 by Aeroquip Corporation. Pages 1-10 of the bulletin which describe aspects of the system, under heading identification including "The System", among others, are incorporated herein by reference.

Utilization of the above system, however, has initial costly disadvantages. The adaptation of an operating fleet of construction equipment to the FD 65 Fueling System, is expensive both in terms of dollars and man-hours. The standard procedure is to remove the operator's cab and fuel tank, steam the tank, then weld a 2-inch pipe sleeve in the top of the tank for the vent. Another 2-inch sleeve must be welded in the bottom or side of the tank for the receiver inlet. Finally, the old fuel cap must be sealed off. This operation requires between 3 to 5 eight-hour shifts to adapt each piece of equipment.

The present invention discloses fueling unit apparatus (hereinafter "fueling unit") which significantly reduces the investment in labor and materials costs which the above standard procedure required in order to adapt present construction equipment to the Aeroquip Fueling System.

DISCLOSURE OF INVENTION

According to the present invention, the fueling unit which screws into the existing fuel tank opening permits the use of an automatic fueling system, such as the Aeroquip FD 65, wherein the fuel flow is regulated by a vent assembly. The fueling unit comprises the following:

(a) a double-walled tubular member comprising an inner wall member and an outer wall member insertable into the top of a fuel receiver;

(b) means for retaining a portion of the double-walled tubular member external to the fuel receiver;

(c) means for connecting an inlet line to that portion of the outer wall member which is external to the fuel receiver;

(d) a passage defined by the inner wall member which communicates between the vent assembly and the receiver;

(e) a passage defined by the inner and outer wall members of the double-walled tubular member which communicates between the inlet line and the fuel receiver;

(f) means for connecting a vent assembly to that portion of the inner wall member which is external to the fuel receiver; and (g) at least one port which communicates the vent assembly and the interior of the fuel receiver with the passage defined by the inner wall member by extending through bores in both the inner and outer wall members.

Thus, the fueling unit interconnects the fuel receiver, the nozzle of the inlet line, and the vent assembly.

The present invention, as disclosed, overcomes the initial disadvantage of an automatic bottom fueling system. Specifically, this disadvantage is the heavy investment required in adapting a conventional fleet of construction equipment to a bottom loading system. The instant fueling unit requires only 15 to 30 minutes to install. Loading can be accomplished either by connecting the nozzle of the inlet line directly to the fueling unit, or to a remote receiving line which connects to the fueling unit. An assorted fleet of 22 bulldozers, patrols, loaders, and rock chasers were converted with the present invention in less than eight hours total down time. This is a significant reduction in the minimum 24-hour period required to adapt an automatic bottom fueling system according to the conventional means.

Other advantages flow from the utilization of the present invention. The shrouding effect of the double-walled tubular member around the vent assembly ensures sealing of the vent ball and shut-off of the nozzle of the inlet line without fuel overflow. Since the fittings are located at the top of the fuel receiver they are easily serviced and replaced without requiring a draining of the fuel receiver. Furthermore, with the fueling unit on top of the fuel receiver, there is no static head pressure which can cause the automatic shut-off feature to become erratic as with the old bottom or lower side locations.

Other objects and advantages of the invention will become known by reference to the following description and accompanying drawings.

BRIEF DESCRIPTION OF THE DRAWINGS

FIG. 4 is an enlarged view in section generally as seen along the line 4—4 in FIG. 2.

BEST MODE FOR CARRYING OUT THE INVENTION

Figure 1:
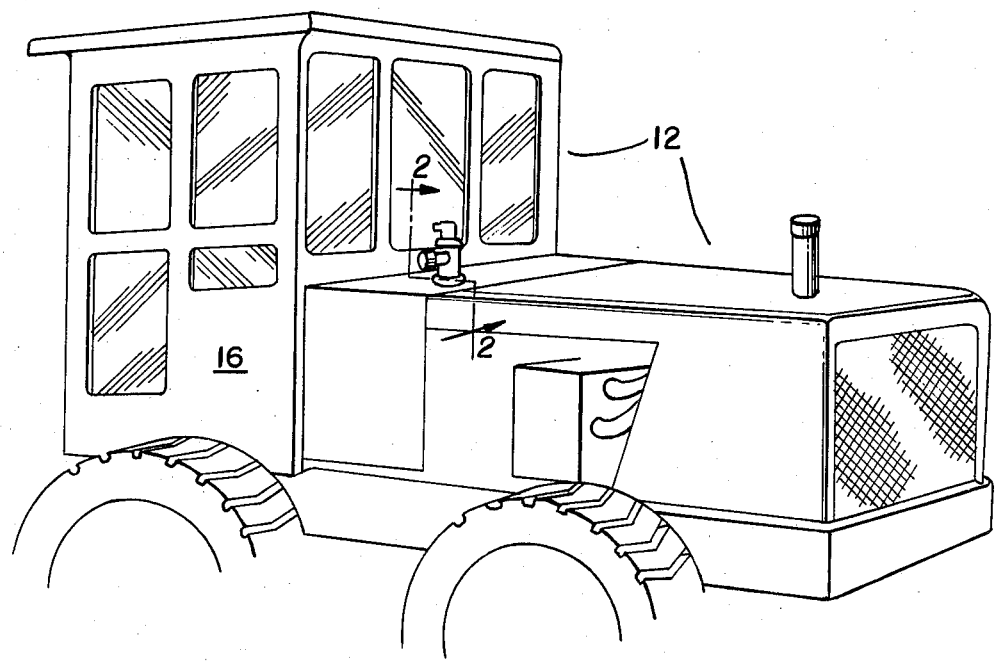
FIG. 1 is a perspective view of a vehicle illustrating a possible mounting orientation for the fueling unit of the present invention.

The fueling unit 10 comprising one portion of a fueling system to be described in greater detail below is illustrated in FIG. 1 in mounted position on a vehicle 12 in a position to the top of the fuel receiver or tank 14 within the region generally forwardly of the cab 16 of the vehicle. The vehicle which is illustrated in the figure is representative of surface-type equipment, such as bulldozers, patrols, loaders, and rock chasers, to name only a few typical types of service equipment which may be utilized, for example, at mining installations.

Figure 2:
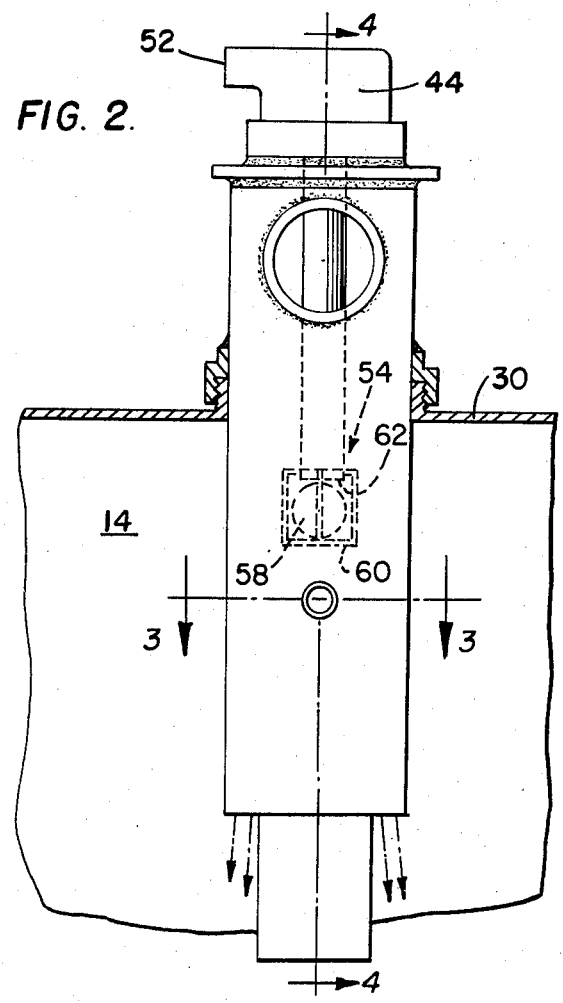
FIG. 2 is an enlarged view of the fueling unit, partly in section as seen along the line 2—2 in FIG. 1.

The fueling unit, which may be seen to best advantage in FIGS. 2 and 4, includes a pair of tubular members 18, 20, both of which may be supported by a plate 22. The plate is annular in outline and both of the tubular members are mounted in a manner such that they are concentric about the axis of an opening 24 in the plate. The tubular member 18 is coextensive throughout a portion of the length of tubular member 20 and defines a passage 26 bounded by the outer surface of tubular member 20 and the inner surface of tubular member 18. A passage 28 is bounded by the inner surface of tubular member 20.

The tubular members 18, 20 are of thin-walled material which may comprise a plastic or a metal. Many plastics which display characteristics of structural rigidity, which are sturdy, capable of long life in the particular adaptation of the present invention, i.e., capable of withstanding pressures exerted by the fueling unit to be generally described below and not deleteriously affected by the particular fluid such as diesel fuel and gas turbine fuels (kerosene) which may be used in powering the vehicle 12 are known, but it is preferable that the tubular members and the other structural components of the fueling unit be formed of metal, such as stainless steel among others as are well known.

The fueling unit 10 is adapted to be received on and supported by a wall 30 which may be the outer wall of tank 14 or a wall of vehicle 12 below which the tank is supported. To this end, a cap 32 may be secured to the tubular member 18 in position to cooperate with a collar 34 carried by wall 30. Particularly, the fueling unit 10 may be secured in mounted orientation by intercooperating threads formed within the cap and on the outer surface of the collar.

Figure 3:
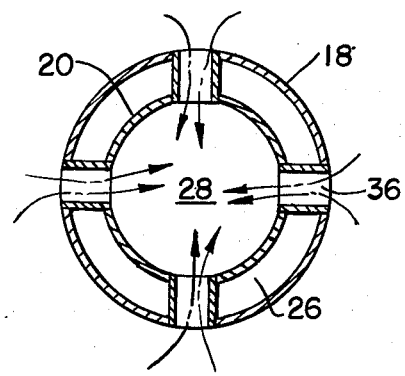
FIG. 3 is a view in section, somewhat enlarged, as seen along the line 3—3 in FIG. 2.

The passage 28 communicates with the enclosed chamber of tank 14 by way of an opening through the distal end of tubular member 20 and one or more ports 36. In the preferred embodiment of the invention, a plurality of four ports communicate the interior of the tank 14 to the passage 28 and these ports as may be seen to best advantage in FIG. 3 are arranged at equidistant spacing around the tubular members 18, 20. The ports 36 may be of any cross-section as is convenient. In the embodiment illustrated in FIGS. 2-4, the ports are circular in cross-section and defined by a tubular element 38 supported in the aligned bores within the tubular members 18, 20. The vertical location of the ports 36 on the tubular members is as follows:

(I) reasonably distanced below the upper wall of the tank 14 such that sufficient vapor pressure build-up activates a vent assembly shut-off comprising a vent float valve 54 prior to a double-walled tubular member fluid level which exceeds the upper tank wall height; and (II) reasonably distanced above the lower end of the double-walled tubular member such that sufficient vapor pressure build-up does not activate a diaphragm sensor of 56 prior to attainment of a fluid level within the tank approaching the upper tank wall.

A sleeve 40 which is concentric with the tubular members 18, 20 is supported on the opposite side of plate 22. The sleeve is threaded internally at least along a major portion of its length, thereby to receive a vent assembly 44 (see FIG. 2).

A sleeve 46, similar to the sleeve 40, is supported by the tubular member 18 within the region above the location of cap 32. The sleeve 46 extends from the tubular member along an axis perpendicular to the axis of concentricity and is of a length to extend beyond the outer diameter of plate 22.

The various components of which the fueling unit 10 is comprised may be connected together in any convenient manner, such as by conventional welding techniques. The fueling unit 10 has a particular adaptation of use in combination with an automatic fueling system, more particularly the denominated "FD 65 Automatic Fueling System" marketed by Aeroquip Corporation. In operation, a nozzle of an inlet line 48 is removably connected to sleeve 46 of the fueling unit 10 thereby to connect the fueling unit and tank 14 to a source of fuel located in a fuel truck or storage facility (neither is shown.) The manner of connection of the nozzle of the inlet line to the fueling unit may be by means of a push connect. Fuel flows as illustrated in FIG. 4 through the automatic shut-off portion 50 of the nozzle. The diaphram sensor 54 is illustrated schematically within the automatic shut-off portion; and, as will be more particularly discussed, the sensor responds to a level of pressure within reservoir 14 to stop the flow of fuel.

Specifics of the vent assembly 44, and the nozzle of the inlet line 48 may be gleaned from the bulletin referred to above.

Briefly, however, during a filling operation capable of clean, rapid and automatic fueling of vehicle 12 with any particular fuel required to power the equipment may be commenced by a push-connect receipt of the nozzle of the inlet line into sleeve 46 of fueling unit 10 which, as may have been appreciated, is located in a position of access irrespective of the fact that the fueling unit 10 is located at the top of the vehicle. The nozzle of the inlet line is equipped with an automatic shut-off and the sleeve 46 of the fueling unit includes a seal (not shown) which upon disconnection of the nozzle of the inlet line prevents escape of the fuel which may not have reached the vicinity of tank 14. The automatic shut-off acts in concert with the operation of the float valve 54 in vent assembly 44. The float valve includes a float 58 which is adapted to rise within, for example, a cage 60 to a seat 62 within the vent assembly thereby to prevent fluid including vapor from exiting tank 14 and for pressurizing the tank sufficiently to activate the automatic shut-off. Specifically, the tank may be pressurized within a range of from about 4 to about 8 psi although the value to which the tank may be pressurized and the value to which the automatic shut-off is set to respond may be adjusted as necessary. Upon the dispensing of fuel into tank 14 through the passage 26, it may be appreciated that fluid and other vapor as displaced by the fuel entering the tank, is relieved to the atmosphere through passage 28, ports 36 and ultimately the port 52 in vent assembly 44. A length of hose (not shown) may be attached to the port thereby to assist in the prevention of entry either of water or dirt or any other contaminant during operation of the vehicle. The vent assembly includes one or more ports (not shown) to permit entry of air into tank 14 as fuel is used. Further, as described in the aforementioned bulletin, the vent assembly may be equipped with an automatic relief valve which will open if pressure within the tank 14 exceeds some predetermined pressure level, for example, 15 psi and fuel shut-off has not occured.

In the drawing, particularly FIGS. 2 and 4, the several arrows which are illustrated both directed toward and extending along passage 26 represent the flow of fuel, into tank 14. The several arrows illustrated in FIG. 3 and the additional arrows in FIG. 4 represent the flow of fluid or vapor displaced from the tank upon an increase in the level of fuel thereby to enter into passage 28 both through the opening and the distal end and through the several ports 36 to flow through vent assembly 44 and either into the atmosphere or into some fuel recovery system. In FIG. 2, float 58 is illustrated in a position removed from seat 62, and in FIG. 4, the float is illustrated in position against the seat.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

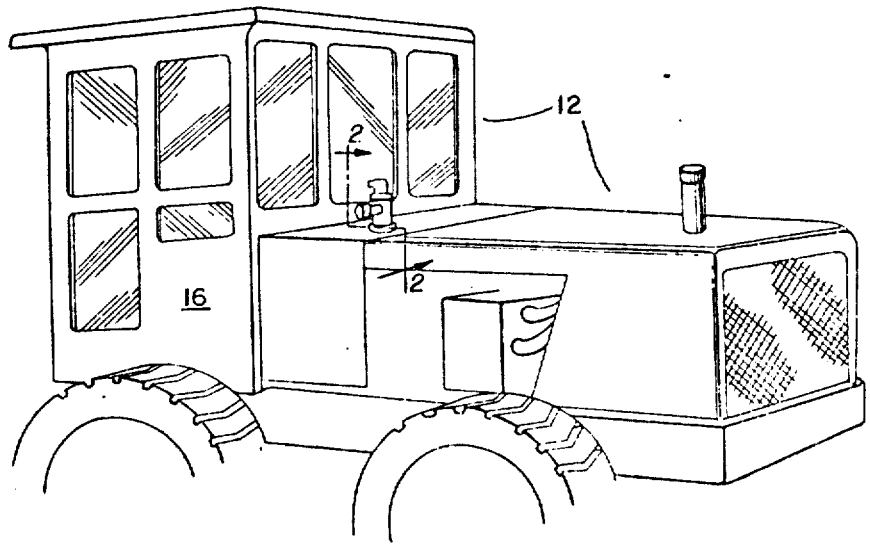

I claim:

1. A fueling unit for use between a receiver, an inlet line, and a vent assembly comprising:
   (a) a double-walled member formed by an inner wall member and an outer wall member insertable into an opening in the top of a receiver;
   (b) means for sealingly mounting the outer wall member in said opening so that the member extends externally as to the receiver;
   (c) means for connecting an inlet line to that portion of the outer wall member which is external to the receiver;
   (d) a first passage within the inner wall member adapted to communicate the vent assembly and receiver;
   (e) a second passage between the inner and outer wall members;
   (f) means for supporting said inner and outer wall members so that said inner wall member extends externally as to the receiver and closing one end of said second passage, said second passage then communicating said inlet line and receiver;
   (g) means for connecting a vent assembly to that portion of the inner wall member which is external to the receiver;
   (h) at least one port which communicates the interior of the receiver with the first passage through bores in both the inner and outer wall members;
   (i) sensor means in the inlet line responsive to a level of vapor pressure for interrupting fuel flow to the receiver; and,
   (j) valve means in the vent assembly which is adapted to close when the receiver is filled with fuel to a desired level to activate the sensor means to increase in vapor pressure within the receiver at a value commensurate with the level of fill which shall at least equal a value of vapor pressure to which the sensor means responds.

2. A fueling unit as recited in claim 1, wherein there is a plurality of ports which connect the interior of the receiver with the first passage through bores in both the inner and outer wall members.

3. A fueling unit as recited in claim 2 wherein a plurality of four equidistantly spaced ports extend through the bores.

4. A fueling unit as recited in claim 3 wherein the ports are circular in cross-section and defined by a tubular element supported by an alignment of the inner and outer wall member bores.

5. A fueling unit as recited in claim 1 wherein the vertical location of each port is as follows:
   (a) reasonably distanced below the upper wall of the receiver such that sufficient vapor pressure build-up activates said sensor means prior to a fluid level in the double-walled tubular member which exceeds the upper receiver wall height; and
   (b) reasonably distanced above the lower end of the double-walled tubular member such that sufficient vapor pressure build-up does not activate the sensor means prior to a fluid level approaching the upper receiver wall.

6. A fueling unit as recited in claim 1 wherein the means for sealingly mounting said outer wall member comprises:
   (a) a cap externally secured to the outer wall member;
   (b) a collar externally secured to the receiver so as to cooperate with the cap; and
   (d) intercooperating threads on
      (1) the outer surface of the collar, and
      (2) the inner surface of the cap.

7. A fueling unit as recited in claim 1 wherein the vent assembly connecting means comprises:
   (a) a sleeve concentric with the double-walled tubular member;
   (b) an annular plate comprising said means supporting said inner and outer wall members which:
      (1) resides between the sleeve and the double-walled tubular member,
      (2) permits communication between the vent assembly and the first passage, and
      (3) supports the sleeve.

8. A fueling unit as recited in claim 7 wherein the concentric sleeve is threaded so as to cooperate with a threaded fuel vent assembly.

9. A fueling unit as recited in claim 1 wherein the inlet line connecting means comprises a sleeve which extends from the external portion of the outer wall member along an axis perpendicular to the tubular member.

* * * * *

UNITED STATES PATENT AND TRADEMARK OFFICE
CERTIFICATE OF CORRECTION

PATENT NO. : 4,241,770

DATED : December 30, 1980

INVENTOR(S) : Joseph D. Robertson

It is certified that error appears in the above—identified patent and that said Letters Patent is hereby corrected as shown below:

Title page should appear as per attached sheet.

Signed and Sealed this

Second Day of November 1982

[SEAL]

Attest:

GERALD J. MOSSINGHOFF

*Attesting Officer*　　*Commissioner of Patents and Trademarks*

United States Patent [19]

Robertson

[11] 4,241,770
[45] Dec. 30, 1980

[54] FUELING UNIT APPARATUS

[75] Inventor: Joseph D. Robertson, Butte, Mont.

[73] Assignee: The Anaconda Company, New York, N.Y.

[21] Appl. No.: 954,292

[22] Filed: Oct. 24, 1978

[51] Int. Cl.³ .......................... B65B 3/18; B65B 3/26
[52] U.S. Cl. .................................. 141/198; 137/588; 141/285; 285/133 R
[58] Field of Search ............... 137/588, 592; 141/285, 141/286, 290, 295, 298, 299, 309, 310, 392, 198, 199, 204, 212-216, 220-222, 229, 303; 220/85 F, 86 R, 86 AT, 420, 465, 374; 285/133 R, 158

[56] References Cited

U.S. PATENT DOCUMENTS

| 1,978,002 | 10/1934 | Weaver | 141/295 X |
| 2,803,269 | 8/1957 | Switzer | 141/250 |
| 3,205,923 | 9/1965 | Wilson | 141/291 |
| 3,556,175 | 1/1971 | Wolf et al. | 141/285 |
| 3,590,869 | 7/1971 | Von Linsowe | 137/614.03 |
| 3,635,264 | 1/1972 | Milburn | 141/291 |
| 3,976,100 | 8/1976 | Souslin | 137/614.03 |
| 4,002,186 | 1/1977 | Fink et al. | 137/614.03 |

Primary Examiner—Frederick R. Schmidt
Attorney, Agent, or Firm—Pennie & Edmonds

[57] ABSTRACT

A fueling unit apparatus (10) for use between a fuel receiver (14), an inlet line (50), and a vent assembly (44) comprising:

(a) a double-walled tubular member (18, 20) insertable into the top of a fuel receiver (14);
(b) means (22) for retaining a portion of the double-walled tubular member externally as to the receiver (14);
(c) means (46) for connecting an inlet line (50) to that portion of the double-walled tubular member's outer wall member which is external to the receiver (14);
(d) a passage (28) defined by the inner wall members (20) of the double-walled tubular member which communicates between the vent assembly (44) and the receiver (14);
(e) a passage (26) defined by the inner (20) and outer wall (18) members of the double-walled tubular member which communicates between the inlet line (50) and the receiver (14);
(f) means (40) for connecting a vent assembly (44) to that portion of the double-walled tubular member's inner wall (20) member which is external to the receiver (14); and
(g) at least one port (36) which connects the vent assembly (44) and receiver's (14) interior with the passage (28) defined by the inner wall member (20) of the double-walled tubular member by extending through bores in both the inner (20) and outer wall (18) members.

9 Claims, 4 Drawing Figures